United States Patent
Hariharan

(10) Patent No.: US 8,704,460 B2
(45) Date of Patent: Apr. 22, 2014

(54) LED CURRENT CONTROL IN A DIMMABLE LED ILLUMINATION SYSTEM

(71) Applicant: Maxim Integrated Products, Inc., San Jose, CA (US)

(72) Inventor: Suresh Hariharan, Livermore, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 1 day.

(21) Appl. No.: 13/660,676

(22) Filed: Oct. 25, 2012

(65) Prior Publication Data

US 2013/0113386 A1 May 9, 2013

Related U.S. Application Data

(60) Provisional application No. 61/556,417, filed on Nov. 7, 2011.

(51) Int. Cl.
*H05B 37/02* (2006.01)
*H05B 33/08* (2006.01)

(52) U.S. Cl.
CPC .................. *H05B 33/0833* (2013.01)
USPC .............. 315/307; 315/200 R; 315/224

(58) Field of Classification Search
CPC .............. H05B 33/0833; H05B 33/0815
USPC .............. 315/200 R, 201, 224, 291, 307
See application file for complete search history.

(56) References Cited

U.S. PATENT DOCUMENTS

| | | | | |
|---|---|---|---|---|
| 8,384,295 B2* | 2/2013 | Simi | ............ | 315/219 |
| 8,558,470 B2* | 10/2013 | Shteynberg et al. | .......... | 315/224 |
| 2010/0164406 A1* | 7/2010 | Kost et al. | ............ | 315/307 |
| 2011/0080111 A1* | 4/2011 | Nuhfer et al. | .......... | 315/291 |
| 2011/0175543 A1* | 7/2011 | Sun et al. | .......... | 315/291 |
| 2012/0235597 A1* | 9/2012 | Nerone | .......... | 315/297 |
| 2013/0241430 A1* | 9/2013 | Lee et al. | .......... | 315/224 |
| 2013/0249437 A1* | 9/2013 | Wang et al. | .......... | 315/307 |
| 2013/0249439 A1* | 9/2013 | Shteynberg et al. | .......... | 315/307 |
| 2013/0300310 A1* | 11/2013 | Hu, Yuequan | .......... | 315/239 |

* cited by examiner

*Primary Examiner* — Don Le
(74) *Attorney, Agent, or Firm* — North Weber & Baugh LLP

(57) ABSTRACT

The invention relates to a light emitting diode ("LED") illumination system, and more particularly, to systems, devices and methods of driving a LED module by a current generator that is powered and controlled by a regulated dc voltage associated with a brightness level. Such a dimmable LED illumination system is compatible with both a high-voltage ac signal coupled from any wall outlet and a low-voltage ac signal provided by an electronic transformer. A diode bridge rectifies the ac signal to a rectified ac signal, and a LED driver generates the LED current from the rectified ac signal and drives the LED to the brightness level. Within the LED driver, the level of the LED current is determined from a boost voltage that is substantially a regulated dc voltage generated from the rectified ac signal.

20 Claims, 5 Drawing Sheets

LED CURRENT CONTROL IN A DIMMABLE LED ILLUMINATION SYSTEM

CROSS REFERENCE TO RELATED APPLICATION

The application claims the benefit under 35 U.S.C. §119(e) of Provisional Application Ser. No. 61/556,417, entitled "LED Current Control in a Dimmable LED Illumination System", filed on Nov. 7, 2011, the subject matter of which is incorporated herein by reference.

BACKGROUND

A. Technical Field

The present invention relates to a dimmable light emitting diode (hereinafter, "LED") illumination system, and more particularly, to systems, devices and methods of driving a LED module by a current generator that is powered and controlled by a regulated dc voltage associated with a brightness level. Such a dimmable LED illumination system is compatible with both a high-voltage ac signal coupled from any wall outlet and a low-voltage ac signal provided by an electronic transformer.

B. Background of the Invention

Semiconductor-based solid-state lighting (SSL), until recently associated mainly with simple indicator lamps in electronics and toys, has become as bright and more efficient than other lighting technologies, such as halogen lamps. In particular, the enormous technology improvements have been achieved on light emitting diodes (LEDs) over the past years. LEDs have been available for various wavelengths, and suitable for white illumination. Lifetime of LEDs is also extended to more than 100 thousand hours, and can work at input powers up to many watts.

When compared to halogen lamps, LEDs are relatively smaller, and have a longer operating life. Moreover, LEDs also require significantly less amount of power to operate than a typical halogen lamp, e.g., MR16. For example, a halogen lamp may operate within a range of 20-50 Watts, while an LED at about 5-10 Watts is sufficient to provide a similar level of brightness.

The halogen lamp is primarily resistive, and a halogen illumination system may be coupled to an electronic transformer in MR16 applications, requiring a minimum power of 20 watts for proper operation. Although customers would like to replace the halogen lamp with LEDs, the original illumination system may not be compatible to the LEDs or properly used to couple the LEDs with the electronic transformers. A single LED lamp consumes a power in the range of 5-10 watts, and when it is loaded to the conventional halogen illumination system, it is inadequate to keep the electronic transformer operational. This problem is addressed by a method disclosed in a previously-filed provisional application 61/526,857. A transformer load compensation circuitry is attached at an output of the electronic transformer to rapidly ramp up a transformer current and a LED driver current.

The dimming control method used to control a resistive halogen lamp is not applicable to control the LEDs that are diodes. FIG. 1 illustrates an exemplary dimmable illumination system 100 based on a LED lamp which operates at a low frequency ac source. In this example, an ac signal is first rectified in a diode bridge 104 and subsequently used by a LED driver 106 to generate a LED current $I_{LED}$ that drives a LED module 108. A dimmer 102 is placed in the path of the ac signal such that duty cycles of the ac signal are offset at leading and trailing edges according to a desired brightness level.

The LED driver 106 comprises two power processing stages, i.e., a boost power processing stage 110 followed by a current regulating stage 112. A capacitor C1 is an energy storage electrolytic capacitor that is applied to reduce voltage ripples for the voltage between two power processing stages. Most applications require power factor correction in the boost power processing stage 110 so that the input current drawn by the LED driver 106 is in phase with the rectified ac signal at the input of the LED driver. In particular, to limit a voltage rating of a switching transistor used in the boost stage 110, the output voltage of the boost stage 110 is regulated to a substantially constant dc voltage independent of the rectified ac signal or the output LED current.

The LED current is determined according to the rectified ac signal. The LED driver further comprises a LED current programming stage 114 that is coupled to the diode bridge 104 and generates a LED current control. The level or the duty cycle of the LED current is adjusted in the current generating stage 112 according to the LED current control, when the dimmable illumination system 100 adopts dc dimming or pulse width modulation (PWM) of the LED current, respectively. The rectified ac signal is associated with the desired brightness level, and the LED current is accordingly adjusted to enable this brightness level in the LED module 108.

Although it functions properly when the ac signal is directly provided from the wall output, the dimmable illumination system 100 fails when an electronic transformer is applied to convert the ac signal to a lower-voltage ac signal. The electronic transformer may not start up due to a reduced load at the output of the diode bridge 104. This reduced load results not only from the LED module 108 but also from a negative feedback that is formed in the LED driver 106 largely due to the use of the LED current programming stage 114. A need exists to improve the LED current programming method in such a dimmable illumination system so that the electronic transformer may be applied as well.

SUMMARY OF THE INVENTION

Various embodiments of the present invention relate to a dimmable LED illumination system, and more particularly, to systems, devices and methods of driving a LED module by a current generator that is powered and controlled by a regulated dc voltage associated with a brightness level. Such a dimmable LED illumination system is compatible with both a high-voltage ac signal coupled from any wall outlet and a low-voltage ac signal provided by an electronic transformer.

One aspect of the invention is a LED driver that drives a LED to a brightness level. A power processing stage is coupled to receive an ac signal and generates a boost voltage that is substantially a dc voltage. A current generator converts the boost voltage to a LED current according to a LED current control that determines the level of the LED current. The LED current is substantially a direct current that drives the LED to the brightness level. A LED current programming stage is coupled to the power processing page to sense the boost voltage and generate the LED current control.

One aspect of the invention is a LED illumination system that comprises a LED, a diode bridge and a LED driver. The diode bridge first rectifies an ac signal to a unidirectional ac signal, and a LED driver generates a LED current from this rectified ac signal. The level of the LED current is determined from a boost voltage that is substantially a dc voltage generated from the rectified ac signal. The LED is driven by the LED current to the brightness level, and this LED current is substantially a direct current.

One aspect of the invention is a method of driving a LED to a brightness level. A boost voltage is first generated from a rectified ac signal, and the boost voltage is substantially a dc voltage. A LED current control is subsequently generated according to the boost voltage. The boost voltage and the LED current control are respectively used to power and control a current generator to generate a LED current that drives the LED to the brightness level.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to a dimmable LED illumination system, and more particularly, to systems, devices and methods of driving a LED module by a current generator that is powered and controlled by a regulated dc voltage associated with a brightness level. The regulated dc voltage is generated from a rectified ac voltage by a power processing stage. As the duty cycle of the rectified ac voltage is determined by a dimmer input, the magnitude of the regulated dc voltage is associated with a desired brightness level. Such a dimmable LED illumination system is compatible with both a high-voltage ac signal coupled from any wall outlet and a low-voltage ac signal provided by an electronic transformer.

Figure 1:
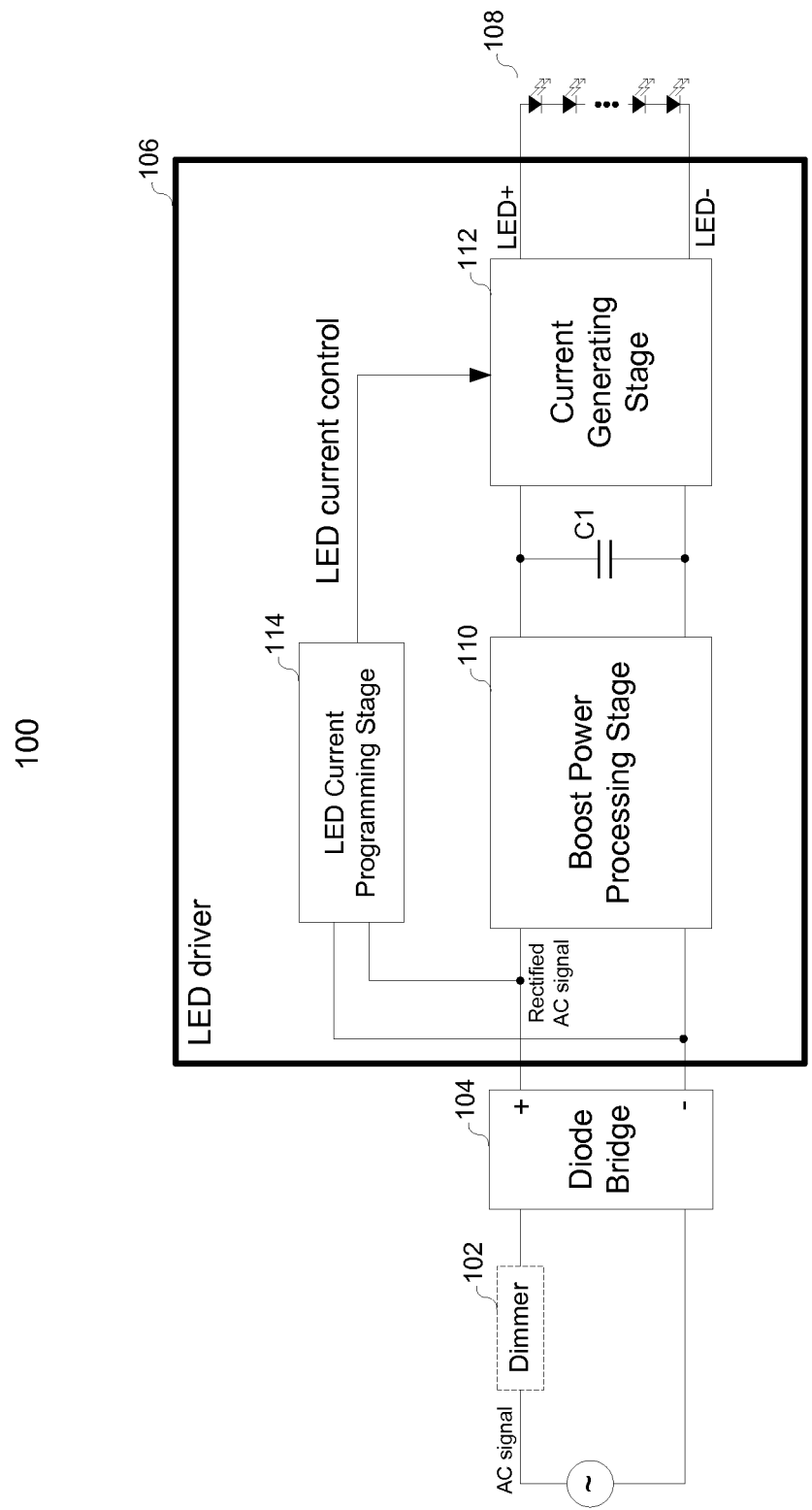
FIG. 1 is illustrates an exemplary dimmable illumination system 100 based on a LED lamp which operates at a low frequency ac source.
Figure 2A:
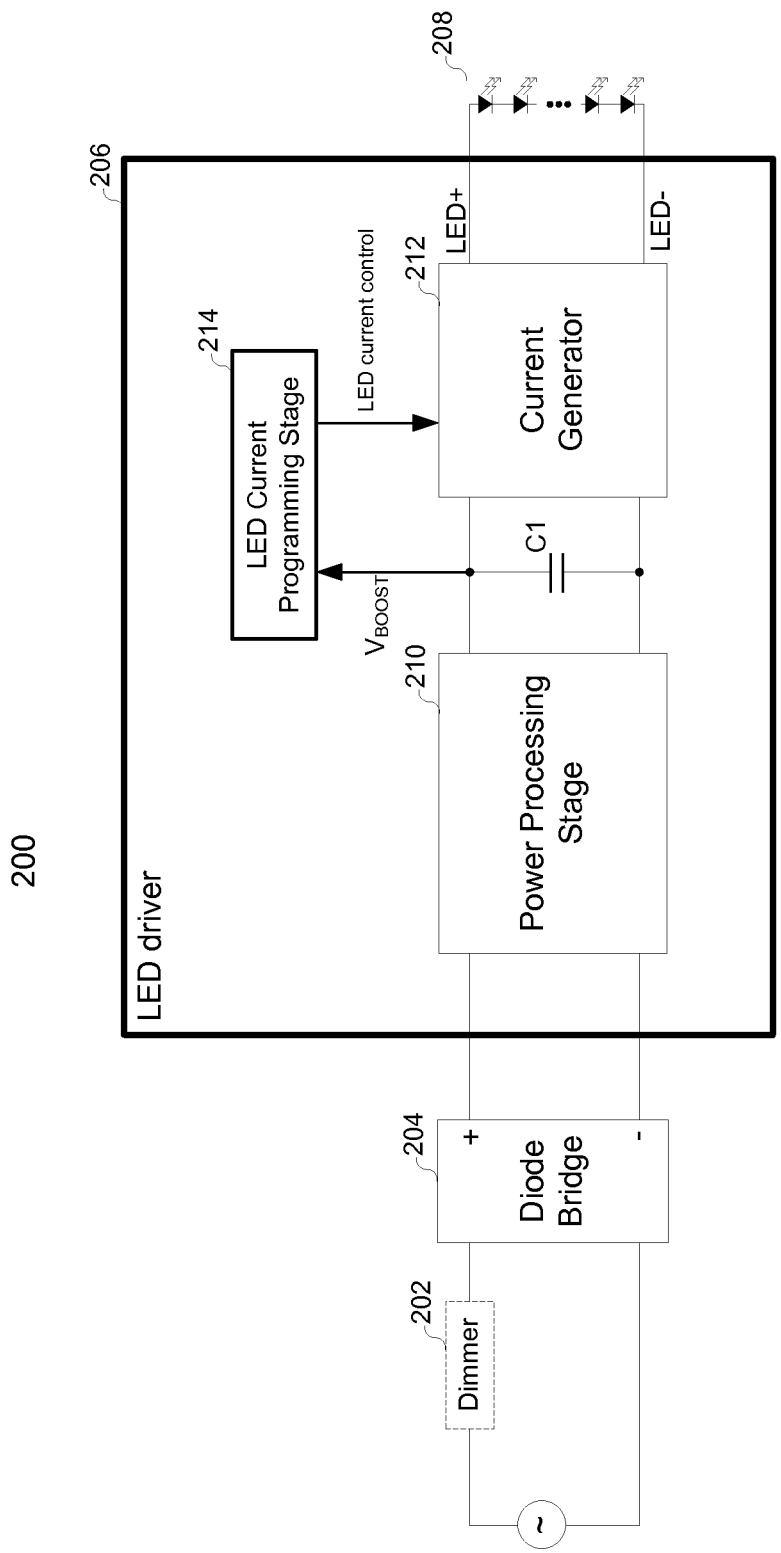
FIG. 2A illustrates an exemplary block diagram of a dimmable LED illumination system according to various embodiments of the invention.

FIG. 2A illustrates an exemplary block diagram 200 of a dimmable LED illumination system according to various embodiments of the invention. The dimmable LED illumination system comprises a dimmer 202, a diode bridge 204, a LED driver 206 and a LED module 208. The LED driver 206 comprises a power processing stage 210 followed by a current generator 212 and a LED current programming stage 214. In various embodiments of the invention, the LED programming stage 214 is coupled to the power processing stage 210 and generates a LED current control for the current generator 212. Therefore, the current generator 212 is both powered and controlled based on a voltage $V_{BOOST}$ that is generated by the power processing stage 210.

The dimmable LED illumination system 200 is coupled to receive an ac signal and generates a LED current to drive the LED module 208. The ac signal may be a high voltage (e.g., 120V or 220V) provided from a wall outlet directly. In certain embodiments, the high-voltage ac signal is converted to a low-voltage ac signal by an electronic transformer prior to driving the dimmable LED illumination system 200. The magnitude of the ac signal may be reduced to 12V, while the frequency is increased to several kHz from 50-60 Hz that is associated with the high-voltage ac signal. The LED current may be a direct current. The level of the dc LED current is associated with a brightness level determined by the dimmer input.

The ac signal is processed by the dimmer 202 and a diode bridge 204 to provide a rectified ac signal to the LED driver 206. The dimmer 202 receives the dimmer input that is associated with a brightness level desired by a user. The dimmer 202 reduces the duty cycle of the ac signal at the leading and trailing edges according to the dimmer input. The diode bridge 204 is coupled to the dimmer 202, and further converts the full-wave dimmed ac signal to a rectified ac signal.

The power processing stage 210 in the LED driver 206 is used to regulate the rectified ac signal to the boost voltage $V_{BOOST}$. The boost voltage $V_{BOOST}$ is a regulated dc voltage. The level of this regulated dc voltage is directly associated with the duty cycle reduction in the rectified ac signal. A lower regulated dc voltage, i.e., the boost voltage $V_{BOOST}$, at the output of the stage 210 is normally associated with a smaller duty cycle for the rectified ac signal and thus a lower brightness level of the LED module 208.

In certain embodiments, the power processing stage 210 is implemented as a boost converter. The boost-based power processing stage 210 is controlled such that the input power is substantially constant over an operating ac voltage range when the dimmer 202 is disabled. When the dimmer 202 is enabled, the maximum peak current drawn by the boost-based stage 210 is clamped. In particular, as the dimmer 202 reduces the duty cycle of the ac voltage, the power consumed by the boost-based stage 210 decreases accordingly. This decrease in power consumption is associated with a decrease of the boost voltage $V_{BOOST}$ at the output of the power processing stage 210.

The current generator 212 is coupled to the power processing stage 210, and converts the boost voltage $V_{BOOST}$ to the LED current. The current generator may be implemented as a buck-boost converter or a buck converter. In particular, a fly-back converter is a preferred embodiment for the current generator 212 when isolation is mandated between the boost voltage $V_{BOOST}$ and the LED current in an illumination system.

The LED current programming stage 214 is coupled to sense the boost voltage $V_{BOOST}$, and generates the LED current control that determines the level of the dc LED current. The LED current control is generated as an analog voltage or a multiple bit digital signal that is used to specify the level of the resulting dc LED current. Therefore, the level of the dc LED current is proportional to the boost voltage $V_{BOOST}$. In certain embodiment, this LED current programming stage 214 is integrated in the current generator 212.

The LED driver 206 further comprises a capacitor C1 to reduce ripples on the boost voltage $V_{BOOST}$. Once the ripples on the boost voltage $V_{BOOST}$ is coupled into the LED current, flickers are observed in illumination from the LED module 208. The capacitance of the capacitor C1 is determined by the amplitude of the ripples that are intended to be reduced, and may vary with the illumination power of the LED module 208. In one exemplary embodiment, the LED illumination system renders an illumination power of 7 W, and a capacitor C1 having capacitance of 220 µF is needed to suppress the ripples and avoid recognizable flickers.

Figure 2B:
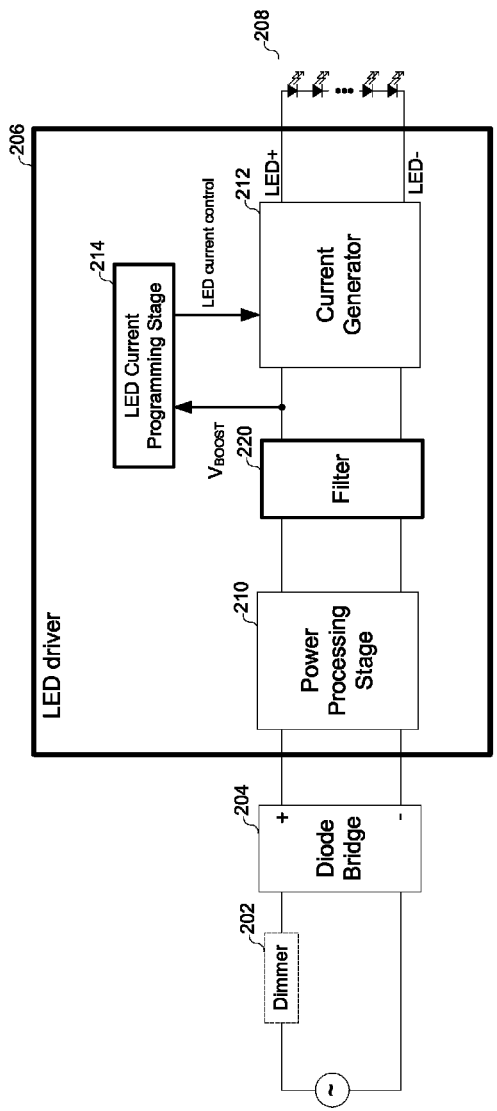
FIG. 2B illustrates another exemplary block diagram of a dimmable LED illumination system according to various embodiments of the invention.

Rather than a large capacitor, a filter may also be employed to suppress the ripples in the boost voltage $V_{BOOST}$. FIG. 2B illustrates another exemplary block diagram 250 of a dimmable LED illumination system according to various embodiments of the invention. A filter 220 is applied to couple the power processing stage 210 and the current generator 212, such that the ripples in the boost voltage $V_{BOOST}$ are reduced before the voltage $V_{BOOST}$ is used to generate the noise-sensitive LED current. In one embodiment, the filter is implemented as a low-pass filter that suppresses high-frequency noises in the boost voltage $V_{BOOST}$. In another embodiment, the filter is implemented as a band-rejection filter that suppresses noises within a frequency spectrum associated with flickers discernible by human eyes.

Figure 3A:
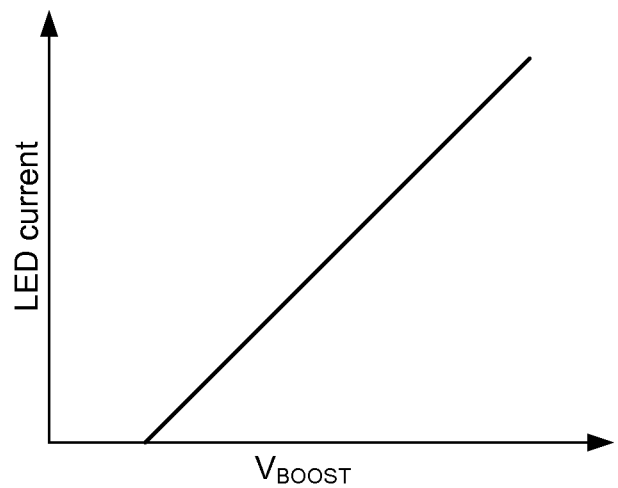
FIG. 3A illustrates an exemplary linear dependence of the resulting LED current on the voltage $V_{BOOST}$ according to various embodiments of the invention.
Figure 3B:
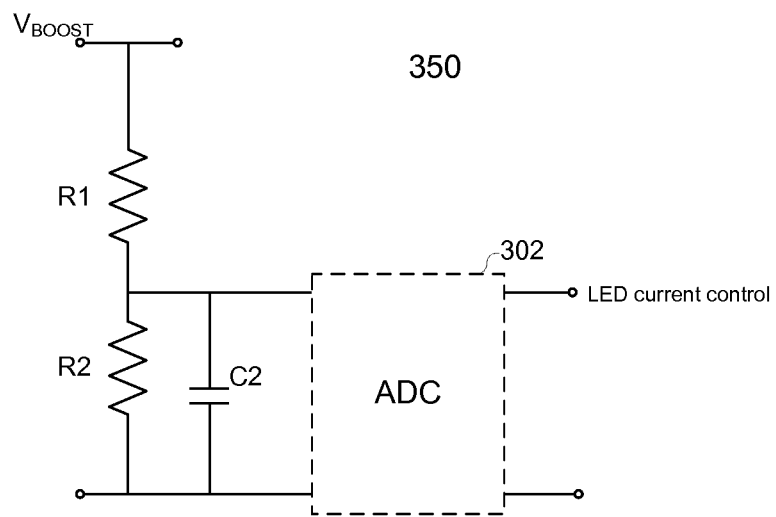
FIG. 3B illustrates a respective exemplary block diagram of a LED current programming stage for dc dimming according to various embodiments of the invention.

FIG. 3A illustrates an exemplary linear dependence 300 of the resulting LED current on the voltage $V_{BOOST}$ according to various embodiments of the invention. The linear relationship is enabled by the LED current control generated by the LED current programming stage 214. FIG. 3B illustrates an exemplary block diagram 350 of a LED current programming stage 214 for dc dimming according to various embodiments of the invention. A resistive divider comprising resistors R1 and R2 is used to generate an intermediate analog voltage proportional to the boost voltage $V_{BOOST}$. This intermediate analog voltage may be outputted as the LED current control directly.

In certain embodiment, the current generator 212 is based upon a digital-to-analog converter (DAC) that requires a digital LED current control. An analog-to-digital converter (ADC) 302 may be employed to convert the intermediate analog voltage to a multiple-bit digital signal that is outputted as the LED current control.

Figure 4:
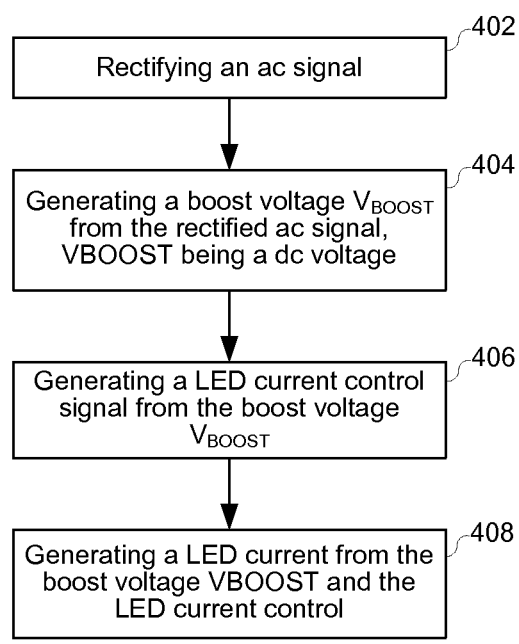
FIG. 4 illustrates a flow chart of a method of driving a LED module by powering and controlling a current generator with a regulated dc voltage according to various embodiments of the invention.

FIG. 4 illustrates a flow chart 400 of a method of driving a LED module by powering and controlling a current generator with a regulated dc voltage according to various embodiments of the invention. At step 402, an ac signal is rectified. The ac signal may be a high-voltage ac signal directly coupled from any wall outlet or a low-voltage ac signal provided by an electronic transformer. In various embodiments of the invention, the ac signal may be modulated by a dimmer prior to step 402, such that the duty cycle of the ac signal is offset to associate with a desired brightness level determined by a dimmer input.

At step 404, a boost voltage $V_{BOOST}$ is generated from the rectified ac signal. The boost voltage $V_{BOOST}$ is a regulated dc voltage, and the corresponding magnitude is associated with the desired brightness level. At step 406, the boost voltage $V_{BOOST}$ is used to generate a LED current control. For dc dimming, the LED current control is an analog voltage or a multiple bit digital signal that is used to specify the level of the resulting dc LED current. Thereafter, at step 408, a LED current is generated to drive a LED module based on the boost voltage $V_{BOOST}$ and the LED current control.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A light-emitting diode (LED) driver that drives a LED to a brightness level, comprising:
   a power processing stage, coupled to receive an ac signal, the power processing stage generating a boost voltage that is substantially a dc voltage, the duty cycle of the ac signal being modulated according to a dimmer input that is associated with the brightness level;
   a current generator, coupled to the power processing stage, the current generator converting the boost voltage to a LED current according to a LED current control that determines the level of the LED current, the LED current being substantially a direct current that drives the LED to the brightness level; and
   a LED current programming stage, coupled to the power processing page, the LED current programming stage sensing the boost voltage and generating the LED current control.

2. The LED driver according to claim 1, further comprising:
   a capacitor, coupled at the output of the power processing stage, the capacitor reducing ripples on the boost voltage and preventing flickers in illumination of the LED.

3. The LED driver according to claim 1, wherein the LED current programming stage and the current generator are coupled to the power processing stage via a filter, and the filter reduces noise in the boost voltage.

4. The LED driver according to claim 3, wherein the filter is selected from a low-pass filter and a band-rejection filter.

5. The LED driver according to claim 1, wherein the LED current control is a multiple bit digital signal.

6. The LED driver according to claim 1, wherein the power processing stage is implemented as a boost converter and controlled such that the input power is substantially constant as the ac signal varies over a range without a dimmer.

7. The LED driver according to claim 1, wherein the current generator is selected from a buck-boost converter and a buck converter.

8. The LED driver according to claim 1, wherein the current generator is a fly-back converter.

9. The LED driver according to claim 1, wherein the magnitude of the LED current is proportional to that of the boost voltage.

10. The LED driver according to claim 1, wherein the LED driver is coupled to a diode bridge, the diode bridge rectifying a full-wave ac signal to the ac signal that is a half wave.

11. The LED driver according to claim 10, wherein the diode bridge is coupled to a dimmer, the dimmer reducing the duty cycle of the full-wave ac signal at leading and trailing edges according to the dimmer input that is associated with the brightness level.

12. A light-emitting diode (LED) illumination system, comprising:
   a light-emitting diode (LED) that is driven by a LED current to a brightness level, the LED current being substantially a direct current;
   a diode bridge, coupled to receive an ac signal, the diode bridge rectifying the ac signal to a unidirectional ac signal; and
   a LED driver, coupled between the diode bridge and the LED, the LED driver generating the LED current from the rectified ac signal, the level of the LED current being determined from a boost voltage that is substantially a dc voltage generated from the rectified ac signal.

13. The LED illumination system according to claim 12, wherein the LED driver further comprises:
   a power processing stage, coupled to receive the rectified ac signal, the power processing stage generating the boost voltage;
   a current generator, coupled to the power processing stage, the current generator converting the boost voltage to the LED current according to a LED current control that determines the level of the LED current; and
   a LED current programming stage, coupled to the power processing page, the LED current programming stage sensing the boost voltage and generating the LED current control.

14. The LED illumination system according to claim 12, further comprising a dimmer that couples the ac signal to the diode bridge, the dimmer reducing the duty cycle of the ac signal at leading and trailing edges according to a dimmer input that is associated with the brightness level.

15. The LED illumination system according to claim 12, wherein the ac signal is selected from a high-voltage ac signal at any wall outlet and a low-voltage ac signal provided by an electronic transformer.

16. A method of driving a light-emitting diode (LED) to a brightness level, comprising:
   rectifying an ac signal, the duty cycle of the ac signal being modulated according to a dimmer input that is associated with the brightness level;
   generating a boost voltage from the rectified ac signal, the boost voltage being substantially a dc voltage;
   generating a LED current control according to the boost voltage; and
   power a current generator using the boost voltage to generate a LED current, the current generator being controlled by the LED current control, the LED current being substantially a direct current that drives the LED to the brightness level.

17. The method according to claim 16, wherein a capacitor is used to reduce ripples on the boost voltage and prevent flickers in illumination of the LED.

18. The method according to claim 16, wherein the step of generating the boost voltage further comprises a step of:
   filtering the boost voltage using a filter selected from a low-pass filter and a band-rejection filter prior to outputting the boost voltage.

19. The method according to claim 16, wherein the LED current control is a multiple bit digital signal.

20. The method according to claim 16, wherein the magnitude of the LED current is proportional to that of the boost voltage.

* * * * *